United States Patent
Balan et al.

(10) Patent No.: US 11,018,909 B2
(45) Date of Patent: May 25, 2021

(54) RECEIVER ADAPTATION USING STOCHASTIC GRADIENT HILL CLIMBING WITH GENETIC MUTATION

(71) Applicant: NVIDIA CORPORATION, Santa Clara, CA (US)

(72) Inventors: Vishnu Balan, Saratoga, CA (US); Mohammed Mobin, Murphy, TX (US); Rohit Rathi, Milpitas, CA (US); Dai Dai, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/993,180

(22) Filed: Aug. 13, 2020

(65) Prior Publication Data
US 2020/0374162 A1 Nov. 26, 2020

Related U.S. Application Data (63) Continuation of application No. 16/419,996, filed on May 22, 2019, now Pat. No. 10,749,720.

(51) Int. Cl.
*H04L 27/01* (2006.01)
(52) U.S. Cl.
CPC .................................. *H04L 27/01* (2013.01)

(58) Field of Classification Search
CPC .......... H04B 10/6971; H04L 25/03057; H04L 25/03063; H04L 25/03006; H04L 25/03012; H04L 25/03019; H04L 25/03159
See application file for complete search history.

(56) References Cited

U.S. PATENT DOCUMENTS

| | | |
|---|---|---|
| 2005/0286625 A1 | 12/2005 | Jung |
| 2010/0290515 A1 | 11/2010 | Dai et al. |
| 2017/0222848 A1 | 8/2017 | Sun et al. |
| 2020/0007133 A1* | 1/2020 | Littmann .............. H04L 7/0058 |

* cited by examiner

*Primary Examiner* — Kevin Kim
(74) *Attorney, Agent, or Firm* — Artegis Law Group, LLP (57) ABSTRACT

A receiver receives communications over a communication channel, which may distort an incoming communication signal. In order to counter this distortion, the frequency response of the receiver is manipulated by adjusting several frequency response parameters. Each frequency response parameter controls at least a portion of the frequency response of the receiver. The optimal values for the frequency response parameters are determined by modifying an initial set of values for the frequency response parameters through one or more of stochastic hill climbing operations until a performance metric associated with the receiver reaches a local maximum. The modified values are displaced through one or more mutation operations. The stochastic hill climbing operations may subsequently be performed on the mutated values to generate the final values for the frequency response parameters.

20 Claims, 8 Drawing Sheets

RECEIVER ADAPTATION USING STOCHASTIC GRADIENT HILL CLIMBING WITH GENETIC MUTATION

CROSS-REFERENCE TO RELATED APPLICATIONS

This application is a continuation of the co-pending U.S. patent application titled, "RECEIVER ADAPTATION USING STOCHASTIC GRADIENT HILL CLIMBING WITH GENETIC MUTATION," filed on May 22, 2019 and having Ser. No. 16/419,996. The subject matter of this related application is hereby incorporated herein by reference.

BACKGROUND

Field of the Invention

The present invention relates generally to channel equalization and, more specifically, to receiver adaptation using stochastic gradient hill climbing with genetic mutation.

Description of the Related Art

Attenuation distortion occurs in wired or wireless communication channels that do not have flat frequency responses for signals transmitted over the communication channels. When a signal experiences attenuation distortion and phase distortion, some frequencies of the signal are attenuated more than other frequencies. For example, a signal with constant amplitude across its frequency spectrum may exhibit attenuation distortion when some of the signal, as received, includes some frequencies that are greater in amplitude than other frequencies.

To correct for the effects of attenuation distortion and phase distortion, receivers of the signals perform equalization that flattens the frequency responses of the corresponding channels. Thus, a channel that is equalized allows frequency domain attributes of a signal to be reproduced at the output of the channel. To perform such equalization, the receiver selects a combination of parameters that reverse the distortion applied to the signal by the channel.

One technique for selecting the parameters includes a least means square (LMS) approach. In this technique, the values of the parameters are selected in order to optimize the minimum mean square error of a cost function that characterizes the difference between a desired signal and an actual signal. When multiple parameters are optimized using a single shared cost function, the adaptation of the parameters is coupled, such that the adjustment of one parameter results in suboptimal values for the other parameters. The cost function additionally results in a multimodal solution space.

Another technique for selecting the parameters includes a brute force search of all possible combinations of values for the parameters. As the number of parameters increases, the time required to perform the search becomes prohibitive. For example, an exhaustive search of six parameters and seven controls per parameter involves trying close to 300,000 parameter combinations to find an optimal set of parameter values, which can take extended equalization time and far exceeds the time budget associated with real-time equalization of signals.

As the foregoing illustrates, what is needed in the art are more effective techniques for optimizing parameters for performing equalization in receivers.

SUMMARY

One embodiment of a method for adjusting the frequency response of a receiver includes determining a first set of values associated with a plurality of frequency response parameters, wherein each frequency response parameter controls at least a portion of the frequency response of the receiver, generating a second set of values associated with the plurality of frequency response parameters by, for each value in the first set of values, modifying the value until a performance metric associated with the receiver reaches a local maximum, and adjusting the frequency response of the receiver based on the second set of values.

At least one advantage and technological improvement of the disclosed techniques is improved performance over conventional least mean squares (LMS) techniques that cause coupling in the adaptation of large numbers of frequency parameters when the same cost function is used by multiple equalization parameters. Consequently, the disclosed techniques provide technological improvements in interfaces, circuits, software, routines, and/or techniques for performing linear and/or analog equalization.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
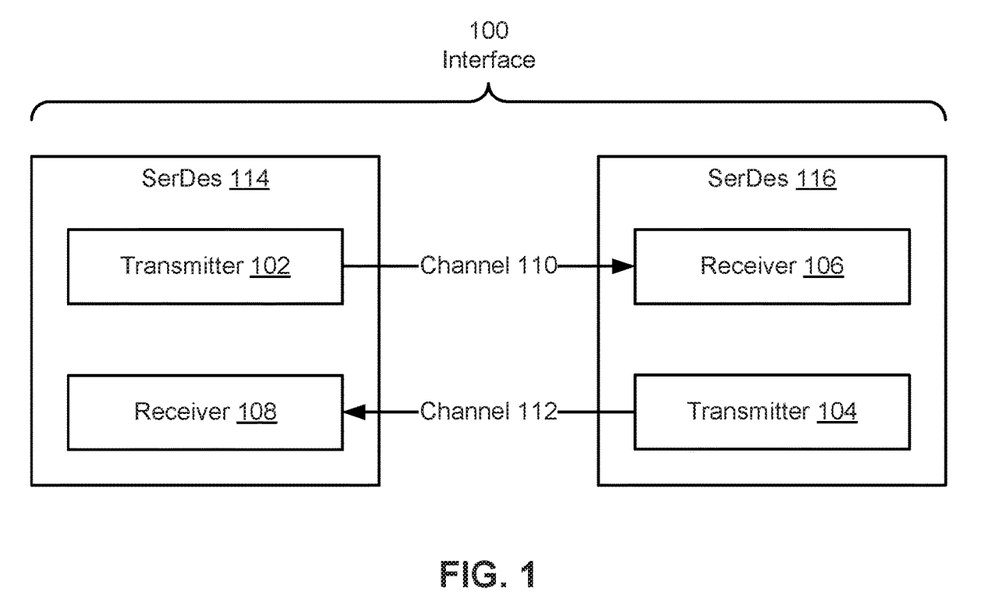
FIG. 1 illustrates a system configured to implement one or more aspects of various embodiments.

FIG. 1 illustrates a system configured to implement one or more aspects of various embodiments. As shown, the system includes an interface 100 between two serializer-deserializers (SerDes) 114-116. SerDes 114 includes a transmitter 102 and a receiver 108, and SerDes 116 includes a transmitter 104 and a receiver 106.

SerDes 114-116 implement an interface 100 over which data and/or signals are transmitted. For example, SerDes 114-116 may provide high-speed communication over chip-to-chip or board-to-board data transfers via processor, control, Ethernet, Fibre Channel, InfiniBand (InfiniBand™ is a registered trademark of InfiniBand Trade Association Corp.), and/or Peripheral Component Interconnect (PCI) buses, interconnects, and/or interfaces.

In various embodiments, data is transmitted from SerDes 114 to SerDes 116 over interface 100 via a channel 110 between transmitter 102 and receiver 106, and data is transmitted in the reverse direction (i.e., from SerDes 116 to SerDes 114) over interface 100 via a separate channel 112 between transmitter 104 and receiver 108. In some embodiments, transmitters 102-104 include Parallel In Serial Out (PISO) components that serialize signals before transmitting the signals over channels 110-112. In some embodiments, receivers 106-108 include Serial In Parallel Out (SIPO) components that convert serial signals received over channels 110-112 into parallel data streams. By converting data from parallel streams to serial streams prior to transmitting the data over channels 110-112, SerDes 114-116 can increase data transmission speeds, reduce the number of interconnects, and/or reduce power dissipation, noise, active area, cost, pins, and/or wiring over techniques that transmit data in parallel over interfaces.

Figure 2:
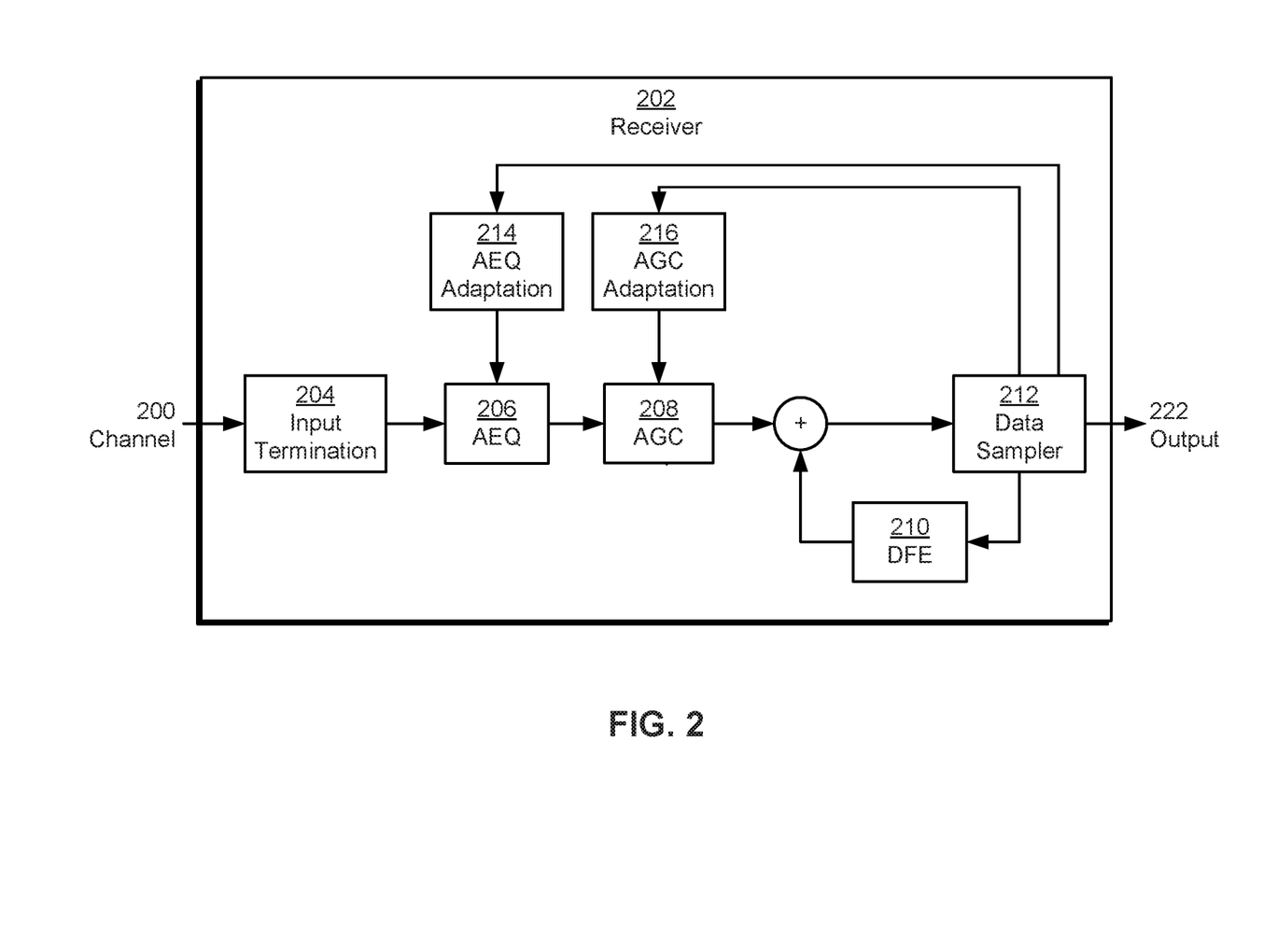
FIG. 2 is a more detailed illustration of a receiver that can be used with the SerDes of FIG. 1, according to one or more aspects of various embodiments.

FIG. 2 is a more detailed illustration of a receiver 202 that can be used with the SerDes 114-116 of FIG. 1, according to one or more aspects of various embodiments. As shown, serial data transmitted over a channel 200 is received at an input termination 204 component of receiver 202. For example, input termination 204 may provide a termination impedance that matches the characteristic impedance of channel 200.

An analog equalizer (AEQ) 206 processes the signal received after input termination 204 to undo distortion caused by transmission of the signal over channel 200. For example, AEQ 206 may perform continuous time linear equalization (CTLE) that attenuates low-frequency signal components, amplifies components around the Nyquist frequency, and filters off high-frequency noise above the Nyquist frequency in the signal. To allow AEQ 206 to function effectively, AEQ adaptation 214 component adapts frequency response parameters used to control the frequency response of receiver 202 to the signal received over channel 200. AEQ 206 and AEQ adaptation 214 are described in further detail below with respect to FIG. 3.

An automatic gain control (AGC) 208 component normalizes the output of the signal after AEQ 206. For example, AGC 208 may output a constant amplitude of the signal from a varying signal amplitude received from AEQ 206. To allow AGC 208 to function effectively, an AGC adaptation 216 component adapts the operation of AGC 208 based on the signal outputted by AEQ 206.

A decision feedback equalizer (DFE) 210 removes intersymbol interference (ISI) associated with distortion of a current pulse from previous pulses in the signal. In some embodiments, DFE 210 operates based on samples of the signal generated by a data sampler 212. For example, data sampler 212 may sample a signal outputted by AGC 208 to generate a bit stream that is used as digital output 222 of receiver 202 and fed back to DFE 210. In turn, DFE 210 subtracts ISI contributed by symbols detected by data sampler 212 from the output of AGC 208.

Figure 3:
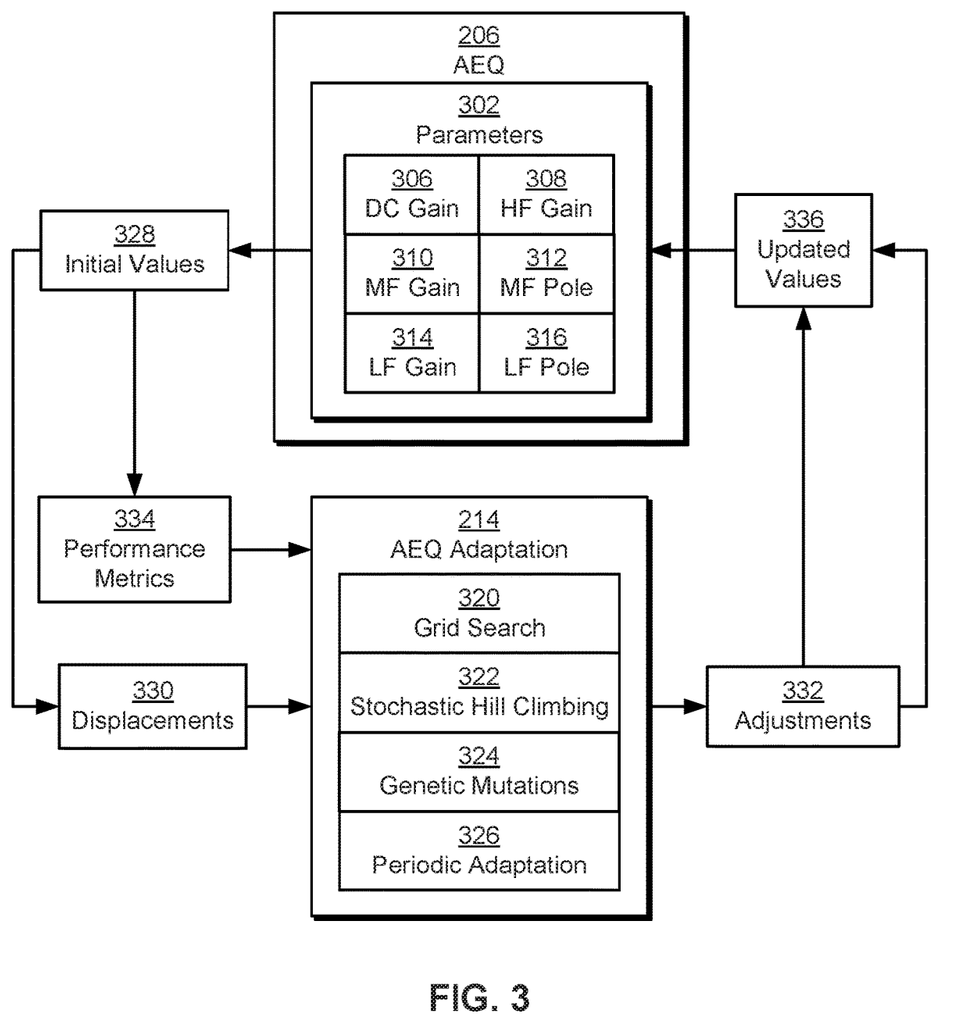
FIG. 3 is a more detailed illustration of the analog equalizer (AEQ) and AEQ adaptation of FIG. 2, according to one or more aspects of various embodiments.

Receiver Adaptation Using Stochastic Gradient Hill Climbing with Genetic Mutation FIG. 3 is a more detailed illustration of AEQ 206 and AEQ adaptation 214 of FIG. 2, according to one or more aspects of various embodiments. As mentioned above, AEQ 206 and AEQ adaptation 214 may be used to perform CTLE of a signal received over channel 200.

More specifically, AEQ 206 performs equalization of the signal based on multiple parameters 302 that control various portions of the frequency response of receiver 200. In some embodiments, parameters 302 include, but are not limited to, a direct current (DC) gain 308, a high frequency (HF) gain 308, a medium frequency (MF) gain 310, a MF pole 312, a low frequency (LF) gain 314, and/or a LF pole 316.

In one or more embodiments, AEQ adaptation 214 is performed to select updated values 336 of parameters 302 that improve or optimize performance metrics 334 associated with the signal outputted by AEQ 206. For example, AEQ adaptation 214 may identify one or more combinations of parameters 302 that produce the best figure of merit (FOM) associated with an eye diagram of the signal. The FOM may include, but is not limited to, the eye height, width, amplitude, opening factor, rise time, fall time, jitter, level zero, level one, bit error rate (BER), and/or level mean; a weighted combination of multiple eye measurements; a signal-to-noise ratio; and/or other measurements or metrics related to the eye diagram.

As shown, AEQ adaptation 214 includes grid search 320, stochastic hill climbing 322, genetic mutations 324, periodic adaptation 326, and/or other types of adjustments 332 to initial values 328 of parameters 302 to improve the frequency response of receiver 200. Each type of adjustment produces one or more sets of updated values 336 of parameters 302 from a corresponding set of initial values 328. Each type of adjustment can be performed alone and/or in conjunction with one or more other types of adjustments 332. Each type of adjustment can also, or instead, be repeated to generate multiple sets of values for parameters 302.

After one or more types and/or rounds of adjustments 332 are performed to produce updated values 336 of parameters 302, AEQ adaptation 214 calculates performance metrics 334 for each set of updated values 336. AEQ adaptation 214 compares performance metrics 334 to identify the best-performing set of updated values 336 and optionally refines the best-performing updated values 336 using other types of adjustments 332. After the best-performing updated values 336 is generated, AEQ adaptation 214 provides the best-performing updated values 336 for use by AEQ 206 in performing CTLE of the signal.

In some embodiments, AEQ adaptation 214 performs grid search 320 for some or all parameters 302. For example, grid search 320 may be used to select values of DC gain 306 and/or HF gain 308, and other types of adjustments 332 may be used to select values of remaining frequency response parameters 302. In another example, grid search 320 may be used to select values of all six parameters 302 at once.

Grid search 302 includes a coarse grid search using a first grid size associated with parameters 302. During the coarse grid search, all parameters 302 can be searched, or allow some parameters 302 are maintained at default and/or initial values 328 while other parameters 302 are searched. After the coarse grid search selects a coarse value of one or more parameters 302 associated with the highest performance metrics 334, AEQ adaptation 214 performs a fine grid search that applies a second, smaller grid size around the selected coarse parameter values to search the vicinity of the coarse parameter values for potentially higher performing parameter values. After grid search 320 is complete, AEQ adaptation 214 stores one or more sets of high-performing parameter values, along with performance metrics 334 associated with the parameter values.

In some embodiments, AEQ adaptation 214 performs stochastic hill climbing 322 for some or all parameters 302. For example, AEQ adaptation 214 may "freeze" DC gain 306, HF gain 308, and/or a combination of other parameters that were identified by grid search 320 to have the best performance metrics 334. AEQ adaptation 214 may subsequently perform stochastic hill climbing 322 of remaining parameters 302, such as HF gain 308 MF gain 310, MF pole 312, LF gain 314, LF pole 316, and/or other parameters 302 that were not involved in grid search 320.

Alternatively, AEQ adaptation 214 performs stochastic hill climbing 322 without performing grid search 320. For example, AEQ adaptation 214 may use stochastic hill climbing 322 to identify one or more sets of parameters 302 that produce locally optimal performance metrics 334 instead of performing a potentially wider grid search 320 of the solution space of parameters 302.

In one or more embodiments, initial values 328 of parameters 302 used with a given round of stochastic hill climbing 322 are set to seed values associated with parameters 302. For example, the seed values may include multiple sets of parameter values that are identified from simulation and/or lab evaluation of the frequency response of receiver 202 to handle different amounts of loss over channel 200. Thus, initial values 328 to which stochastic hill climbing 322 is applied may include seed values associated with a loss that is closest to the current loss over channel 200.

During stochastic hill climbing 322, AEQ adaptation 214 sequentially applies hill climbing adjustments 332 to the seed values until a local maximum in performance metrics 334 is reached for each parameter. For example, AEQ adaptation 214 may obtain a predetermined and/or random ordering of parameters 302 for a given round of hill climbing adjustments 332. AEQ adaptation 214 may adjust the first parameter in the ordering until a local maximum in performance metrics 334. AEQ adaptation 214 may repeat the process with each subsequent parameter in the ordering until all parameters 302 have been adjusted.

To adjust a given parameter in stochastic hill climbing 322, AEQ adaptation 214 randomly selects an amount, up to a maximum, by which the parameter's value is to be adjusted. AEQ adaptation 214 performs a positive adjustment of the parameter using the amount (i.e., by adding the amount to the parameter) and a negative adjustment of the parameter using the amount (i.e., by subtracting the amount from the parameter) and compares performance metrics 334 associated with the parameter's original value, the positive adjustment, and the negative adjustment. AEQ adaptation 214 identifies a direction of adjustment for the parameter to reflect the highest performance metric resulting from the positive adjustment, negative adjustment, and the original parameter value. AEQ adaptation 214 continues changing the parameter value by the selected amount in the direction of adjustment until the performance metric stops improving. If the highest performance metric is produced by more than one of the positive adjustment, negative adjustment, and the original parameter value, AEQ adaptation 214 uses a "tie-breaking rule" and/or an order of priority associated with the positive adjustment, negative adjustment, and original parameter value to select the direction of adjustment.

For example, AEQ adaptation 214 performs stochastic hill climbing 322 after selecting a value of DC gain 306 using grid search 320. During stochastic hill climbing 322, AEQ adaptation 214 adjusts values of the remaining five parameters 302 in the following randomly selected or predetermined order:
1. HF gain 308
2. MF gain 310
3. MF pole 312
4. LF gain 314
5. LF pole 316

Continuing with the above example, AEQ adaptation 214 starts with a seed value of 5 for HF gain 308, which is selected based on the loss over channel 200. AEQ adaptation 214 obtains a FOM of 79 for the seed value of 5 and randomly selects an adjustment amount of 2 for stochastic hill climbing 322 using the seed value. AEQ adaptation 214 calculates a positive adjustment of 7 and a negative adjustment of 3 using the seed value of 5 and selected adjustment amount of 2. AEQ adaptation 214 also obtains a FOM of 99 for the positive adjustment and a FOM of 69 for the negative adjustment. Based on the highest FOM of 99, AEQ adaptation 214 selects a positive direction of adjustment for HF gain 308 during stochastic hill climbing 322. AEQ adaptation 214 reapplies the positive adjustment of 2 to a value of 7 for HF gain 308 to obtain a new value of 9; for the new value of 9, AEQ adaptation 214 calculates an FOM of 111. AEQ adaptation 214 performs the positive adjustment one more time to obtain a value of 11 for HF gain 308 and a corresponding FOM of 109. Because the FOM of 109 for the HF gain value of 11 is lower than the previous FOM of 111 for the HF gain value of 9, AEQ adaptation 214 sets an updated value of HF gain 308 to 9.

Next, AEQ adaptation 214 starts with a seed value of 8 for MF gain 310 and the FOM of 111 at the end of stochastic hill climbing 322 of HF gain 308. AEQ adaptation 214 randomly generates an adjustment amount of 3 for MF gain 310, which results in a positive adjustment of 11 and a negative adjustment of 5 from the original MF gain 310 value of 8. The positive adjustment of 11 and original value of 8 both produce an FOM of 115, while the negative adjustment of 5 results in an FOM of 104. Because two values of MF gain 310 result in the same highest FOM of 115, AEQ adaptation 214 uses a tie-breaking rule to select the original value of 8 for MF gain 310 and discontinues additional stochastic hill climbing 322 related to MF gain 310.

Continuing with the above example, AEQ adaptation 214 continues sequentially adjusting values of MF pole 312, LF gain 314, and LF pole 316 until the FOM is locally optimized with respect to each parameter. After all parameters 302 have been adjusted using different random adjustment amounts and/or adjustment directions, the corresponding round of stochastic hill climbing 322 of parameters 302 is complete.

AEQ adaptation 214 optionally repeats stochastic hill climbing 322 using additional sets of seed values and/or other initial values 328 of parameters 302. For example, AEQ adaptation 214 may apply stochastic hill climbing 322 to multiple sets of seed values associated with a given loss or range of losses over channel 200. AEQ adaptation 214 may also, or instead, vary the order of parameters 302 with which each round of stochastic hill climbing 322 is performed.

In some embodiments, AEQ adaptation 214 applies one or more rounds of genetic mutations 324 around current best AEQ parameters by randomly displacing them within a programmed displacement range of parameters 302 to produce one or more sets of updated values 336 that contain mutations of initial values 328. In some embodiments, each round of genetic mutations 324 includes applying different random displacements, up to a maximum displacement value, to individual parameters 302 to generate mutated values of parameters 302.

For example, initial values 328 used with genetic mutations 324 may include, but are not limited to, seed values of parameters 302 for a given loss or range of losses over channel 200, parameter values selected using grid search 320, and/or parameter values selected using one or more rounds of stochastic hill climbing 322. During each round of genetic mutations 324, each parameter is displaced in a positive or negative direction by a corresponding random displacement, up to a maximum displacement associated with genetic mutation of the parameter. Additional rounds of genetic mutations 324 may then be applied to the same initial values 328, different sets of initial values 328, and/or mutated values generated using previous rounds of genetic mutations 324.

In one or more embodiments, AEQ adaptation 214 generates multiple sets of updated values 336 by iteratively performing stochastic hill climbing 322 followed by genetic mutations 324 of initial values 328 and/or previously generated sets of updated values 336. For example, AEQ adaptation 214 performs a round of stochastic hill climbing 322 adjustments 332 to a set of seed values to produce a set of locally optimized updated values 336 from the seed values. AEQ adaptation 214 applies genetic mutations 324 to the locally optimized values to produce a corresponding set of mutated updated values 336. AEQ adaptation 214 repeats the stochastic hill climbing 322 using the mutated values to produce another set of locally optimized values, and applies another round of genetic mutations 324 to the new set of locally optimized values to produce another set of mutated values.

Continuing with the above example, AEQ adaptation 214 may repeat rounds of stochastic hill climbing 322 followed by corresponding rounds of genetic mutations 324 to produce multiple sets of locally optimized and/or mutated updated values 336 of parameters. AEQ adaptation 214 may also calculate performance metrics 334 for each set of updated values 336 and identify one or more sets of updated values 336 with the highest performance metrics 334.

In some embodiments, after one or more sets of updated values 336 are generated using grid search 320, stochastic hill climbing 322, and/or genetic mutations 324, AEQ adaptation 214 performs periodic adaptation 326 of one or more sets of updated values 336 with the highest performance metrics 334. During periodic adaptation 326, AEQ adaptation 214 applies small, incremental adjustments 332 to each parameter to optimize the parameter with respect to performance metrics 334. For example, AEQ adaptation 214 may use an adjustment amount of 1 (i.e. a unit step) to search or "retest" the vicinity of each parameter's value for potential increases to performance metrics 334. As with stochastic hill climbing 322, periodic adaptation 326 of a parameter includes performing a positive adjustment and a negative adjustment of the parameter's value using the adjustment amount of 1. When a given adjustment produces a higher performance metric, periodic adaptation 326 iteratively proceeds in the direction of the adjustment with the same adjustment amount until the performance metric is locally maximized with respect to the parameter.

After periodic adaptation 326 of one or more sets of updated values 336 is complete, AEQ adaptation 214 selects a final set of values for parameters 302 with the highest performance metrics 334 from the periodically adapted updated values 336. AEQ adaptation 214 then transmits the final values to AEQ 206 and/or configures AEQ 206 to perform CTLE using the final values.

Figure 4:
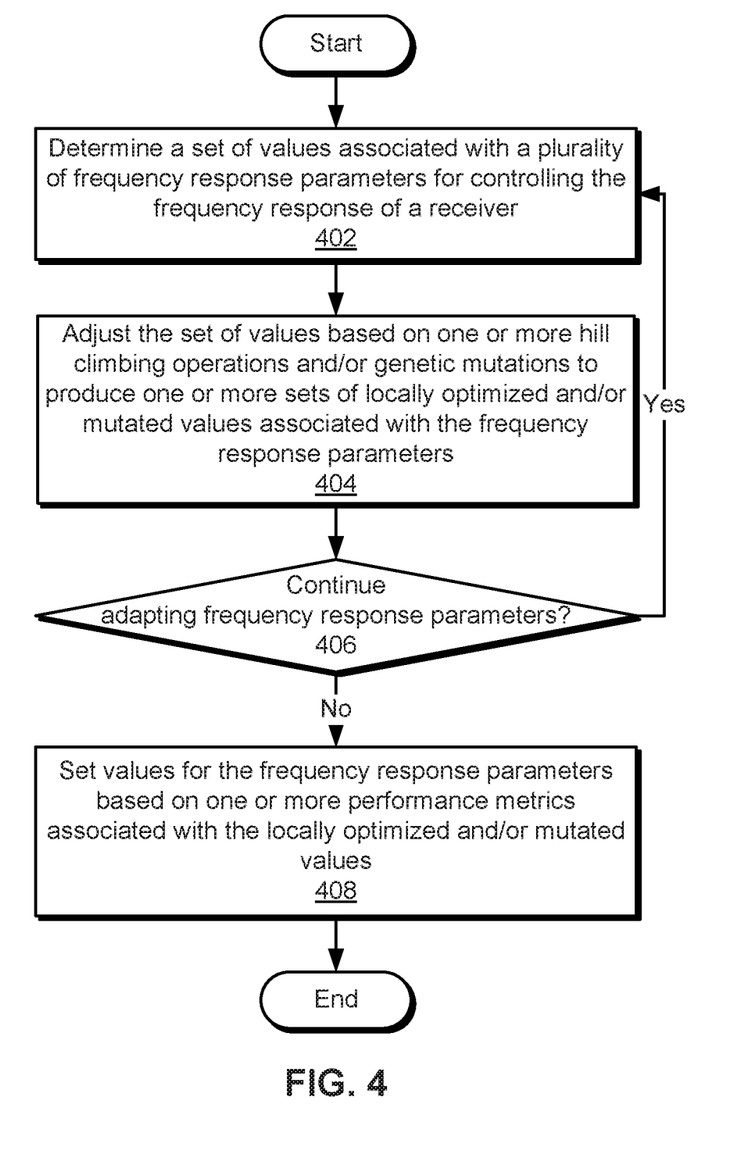
FIG. 4 is a flow diagram of method steps for adjusting a frequency response of a receiver, according to one or more aspects of various embodiments.

FIG. 4 is a flow diagram of method steps for adjusting a frequency response of receiver 202, according to various embodiments. Although the method steps are described in conjunction with the systems of FIGS. 2 and 3, persons skilled in the art will understand that any system configured to perform the method steps in any order falls within the scope of the present disclosure.

As shown, AEQ adaptation 214 determines 402 a set of values associated with a plurality of frequency response parameters for controlling the frequency response of a receiver. For example, AEQ adaptation 214 may perform a grid search of one or more frequency response parameters, as described in further detail below with respect to FIG. 5. AEQ adaptation 214 may also, or instead, set some or all of the values to seed values associated with a loss over channel 200.

Next, AEQ adaptation 214 adjusts 404 the set of values based on one or more hill climbing operations and/or genetic mutations to produce one or more sets of locally optimized and/or mutated values associated with the frequency response parameters. Performing hill climbing operations on frequency response parameters is described in further detail below with respect to FIG. 6, and performing genetic mutations on frequency response parameters is described in further detail below with respect to FIG. 7.

AEQ adaptation 214 may continue 406 adapting frequency response parameters by iteratively determining 402 a different set of values associated with the frequency response parameters and adjusting 404 the values using hill climbing operations and/or genetic mutations. For example, AEQ adaptation 214 may select a different set of seed values in each iteration of operation 402 and apply one or more rounds of stochastic hill climbing and/or genetic mutations to the selected seed values in operation 404. Alternatively, AEQ adaptation 214 may omit operations 404 and 406 if grid search is performed on all frequency response parameters.

AEQ adaptation 214 then generates 408 values for the frequency response parameters based on one or more performance metrics associated with the locally optimized and/or mutated values. For example, AEQ adaptation 214 may calculate one or more metrics and/or measurements representing an FOM for an eye diagram associated with the frequency response of receiver 202. To recover the signal after transmission over channel 200, AEQ adaptation 214 may set frequency response parameters in AEQ 206 to a set of locally optimized and/or mutated values with the highest FOM. AEQ adaptation 214 may optionally apply final incremental adjustments to the locally optimized and/or mutated values to further improve the performance metrics before using the locally optimized and/or mutated values in AEQ 206 of the signal received over channel 200.

Figure 5:
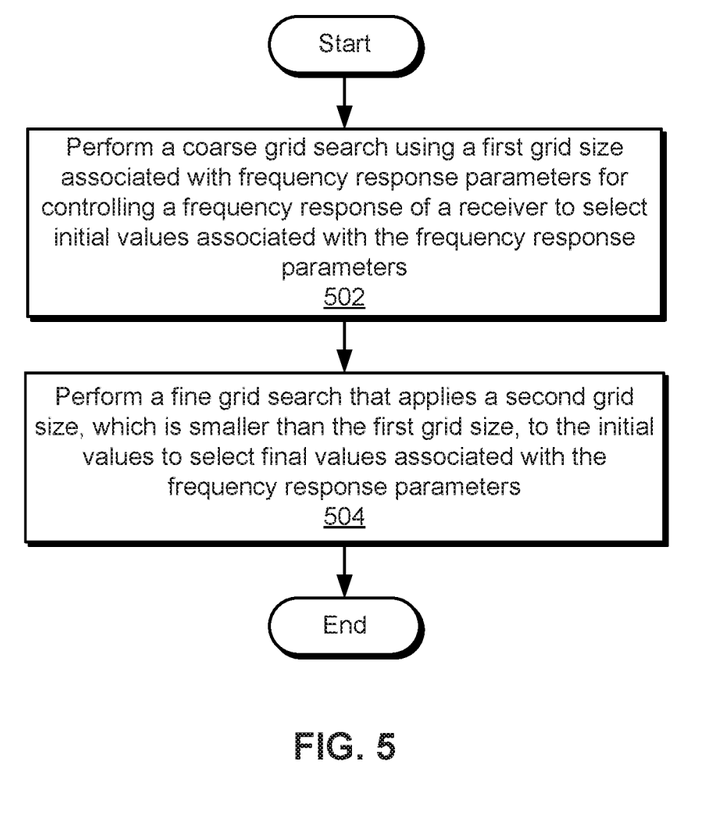
FIG. 5 is a flow diagram of method steps for performing a grid search of frequency response parameters for controlling a frequency response of a receiver, according to one or more aspects of various embodiments.

FIG. 5 is a flow diagram of method steps for performing a grid search of frequency response parameters for controlling a frequency response of a receiver, according to one or more aspects of various embodiments. Although the method steps are described in conjunction with the systems of FIGS. 2 and 3, persons skilled in the art will understand that any system configured to perform the method steps in any order falls within the scope of the present disclosure.

As shown, AEQ adaptation 214 performs 502 a coarse grid search using a first grid size associated with frequency response parameters for controlling the frequency response of receiver 202 to select initial values associated with the frequency response parameters. For example, AEQ adaptation 214 may generate multiple combinations of values for the frequency response parameters. The combinations of values may include different values that are separated by an interval associated with each frequency response parameter. The initial values may include a combination of values that produces the highest FOM and/or performance metric associated with an eye diagram for the frequency response.

Next, AEQ adaptation 214 performs 504 a fine grid search that applies a second grid size, which is smaller than the first grid size, to the initial values to select final values associated with the frequency response parameters. For example, AEQ adaptation 214 may use the smaller grid size to generate multiple combinations of values for the frequency response parameters in the "neighborhood" of the initial values. AEQ adaptation 214 may then set the final values to a combination of values associated with the smaller grid size that produces the highest FOM and/or performance metric from the eye diagram.

Figure 6:
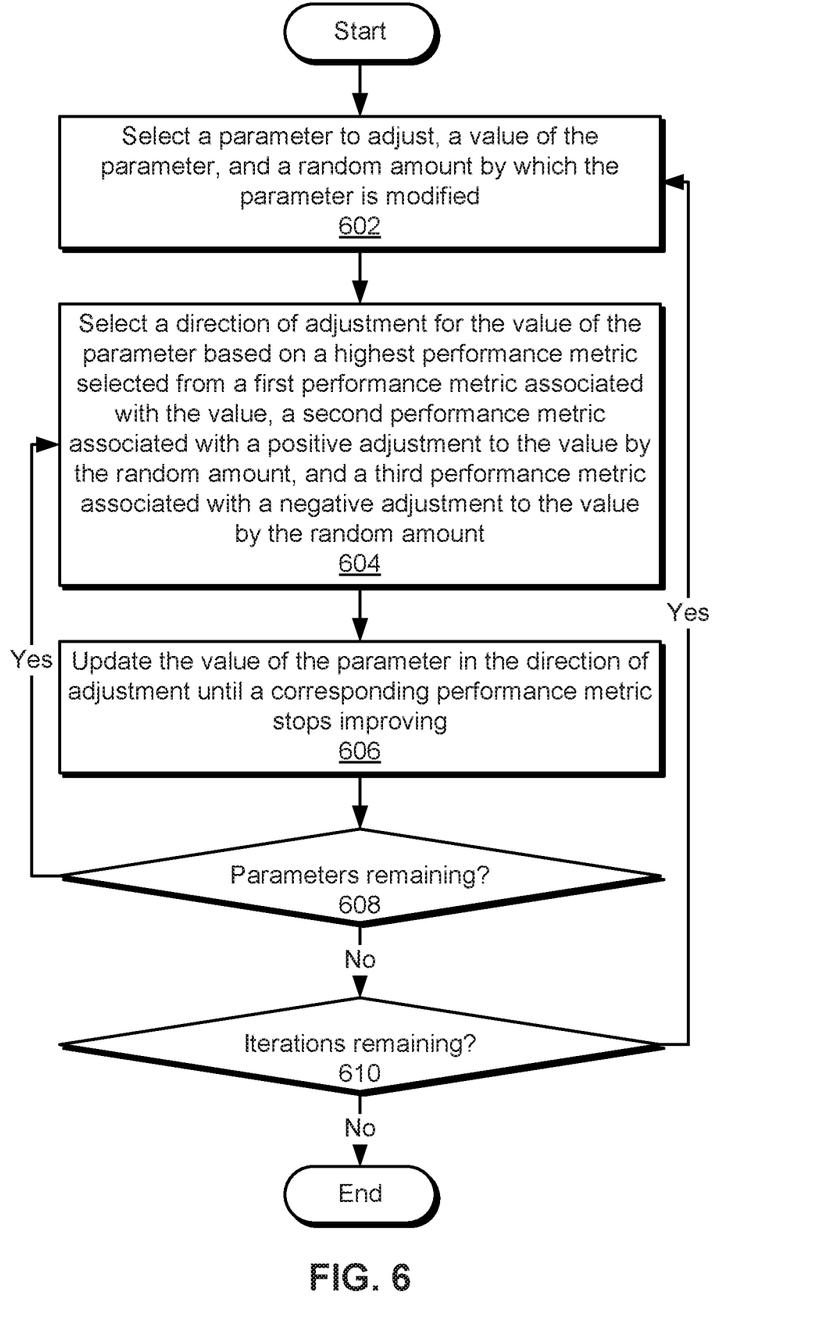
FIG. 6 is a flow diagram of method steps for performing stochastic hill climbing of frequency response parameters for controlling a frequency response of a receiver, according to one or more aspects of various embodiments.

FIG. 6 is a flow diagram of method steps for performing stochastic hill climbing of frequency response parameters for controlling a frequency response of a receiver, according to one or more aspects of various embodiments. Although the method steps are described in conjunction with the systems of FIGS. 2 and 3, persons skilled in the art will understand that any system configured to perform the method steps in any order falls within the scope of the present disclosure.

As shown, AEQ adaptation 214 selects 602 a parameter to adjust, a value of the parameter, and a random amount by which the parameter is modified. For example, AEQ adaptation 214 may select the parameter to adjust according to a predefined ordering of parameters, or AEQ adaptation 214 may randomly select a parameter from the frequency response parameters. AEQ adaptation 214 may set the value of the parameter to a seed value, a value obtained during a grid search, a random value, and/or a mutated value. AEQ adaptation 214 may also determine the random amount (e.g., a number of units) by which the parameter is adjusted, up to a maximum amount.

Next, AEQ adaptation 214 selects 604 a direction of adjustment for a value of the parameter based on a highest performance metric selected from a first performance metric associated with the value, a second performance metric associated with a positive adjustment to the value by the random amount, and a third performance metric associated with a negative adjustment to the value by the random amount. AEQ adaptation 214 then updates 606 the value of the parameter in the direction of adjustment until a corresponding performance metric stops improving.

For example, AEQ adaptation 214 may select a positive direction of adjustment when the second performance metric is highest and a negative direction of adjustment when the third performance metric is highest. AEQ adaptation 214 may then repeatedly increment or decrement the parameter's value by the amount selected in operation 602 according to the direction of adjustment until the performance metric stops increasing. Conversely, AEQ adaptation 214 may omit adjustments to the parameter's value if the first performance metric is highest. When the highest performance metric is produced by more than one of the parameter's value, the positive adjustment, and the negative adjustment, AEQ adaptation 214 may use a tie-breaking technique and/or ordering of priorities associated with adjustments to the parameter's value to select a direction of adjustment.

AEQ adaptation 214 may repeat operations 604-606 for remaining parameters 608 to be adjusted. For example, AEQ adaptation 214 may sequentially apply stochastic hill climbing to a random and/or predetermined ordering of frequency response parameters that include, but are not limited to, a DC gain, HF gain, MF gain, MF pole, LF gain, and LF pole. After AEQ adaptation 214 ha completed stochastic hill climbing for all of the parameters, a set of locally optimized values for the parameters is produced.

AEQ adaptation 214 may additionally repeat operations 602-606 over multiple iterations 610 of hill climbing adjustments to the frequency response parameters. For example, AEQ adaptation 214 may perform stochastic hill climbing with multiple sets of seed values for the frequency response parameters. In another example, AEQ adaptation 214 may generate a set of values to which stochastic hill climbing is applied in a subsequent iteration by mutating the set of locally optimized values generated at the end of a current iteration. AEQ adaptation 214 may then set the frequency response parameters to a set of values associated with a performance metric that indicates the best recovery of the signal transmitted over channel 200, as discussed above.

Figure 7:
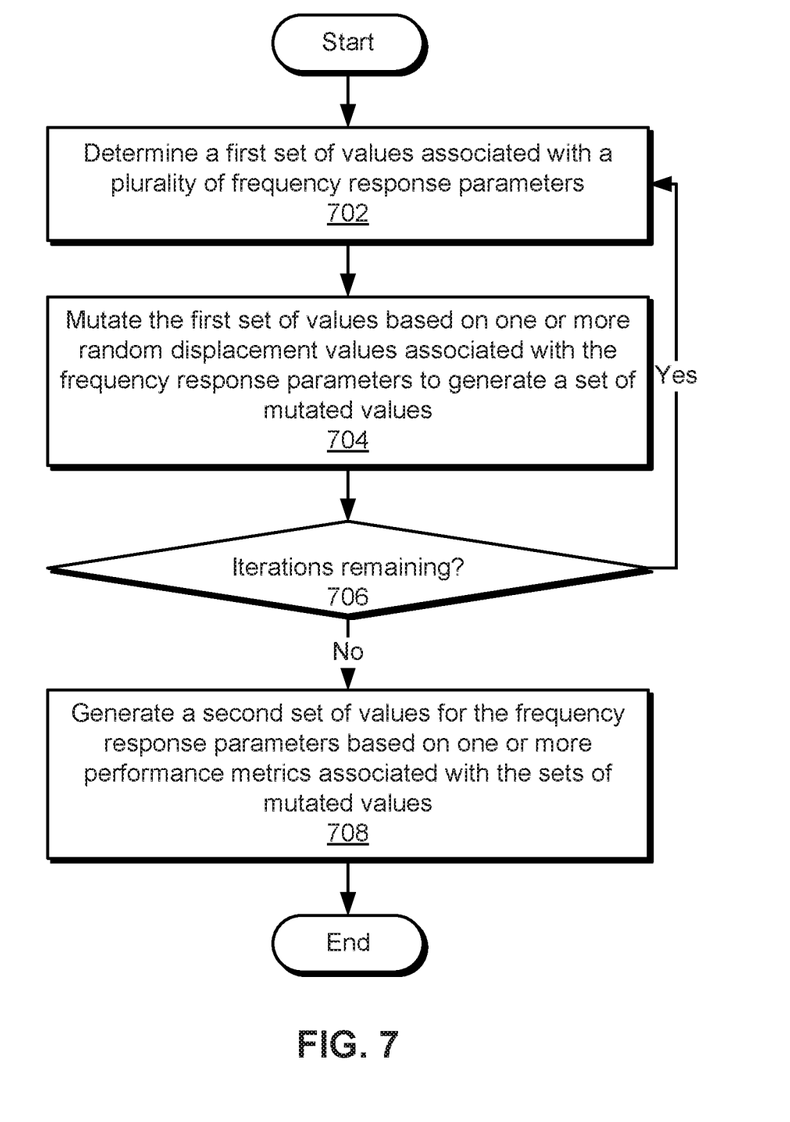
FIG. 7 is a flow diagram of method steps for mutating values of frequency response parameters for controlling a frequency response of a receiver, according to one or more aspects of various embodiments.

FIG. 7 is a flow diagram of method steps for mutating values of frequency response parameters for controlling a frequency response of a receiver, according to one or more aspects of various embodiments. Although the method steps are described in conjunction with the systems of FIGS. 2 and 3, persons skilled in the art will understand that any system configured to perform the method steps in any order falls within the scope of the present disclosure.

As shown, AEQ adaptation 214 determines 702 a first set of values associated with a plurality of frequency response parameters. As mentioned above, the values may include seed values, values obtained during grid search, locally optimized values produced using stochastic hill climbing operations, random values, and/or other values of the frequency response parameters.

Next, AEQ adaptation 214 mutates 704 the first set of values based on one or more random displacement values associated with the frequency response parameters to generate a set of mutated values. For example, AEQ adaptation 214 may generate the mutated values by apply a different positive or negative random displacement value to each parameter's value, up to a maximum displacement value.

AEQ adaptation 214 may repeat operations 702-704 for a number of remaining iterations 706. For example, AEQ adaptation 214 may generate multiple sets of mutated values from other mutated values, different sets of locally optimized values generated using stochastic hill climbing, and/or different sets of seed values. In another example, AEQ adaptation 214 may alternate between hill climbing operations that produce a set of locally optimized values from a set of mutated values and mutating the locally optimized values over a number of iterations.

AEQ adaptation 214 generates 708 a second set of values for the frequency response parameters based on one or more performance metrics associated with the sets of mutated values. For example, AEQ adaptation 214 may set the frequency response parameters used by AEQ 206 to recover the signal transmitted over channel 200 to a set of locally optimized and/or mutated values with the highest FOM associated with an eye diagram of the frequency response.

Example Hardware Architecture

Figure 8:
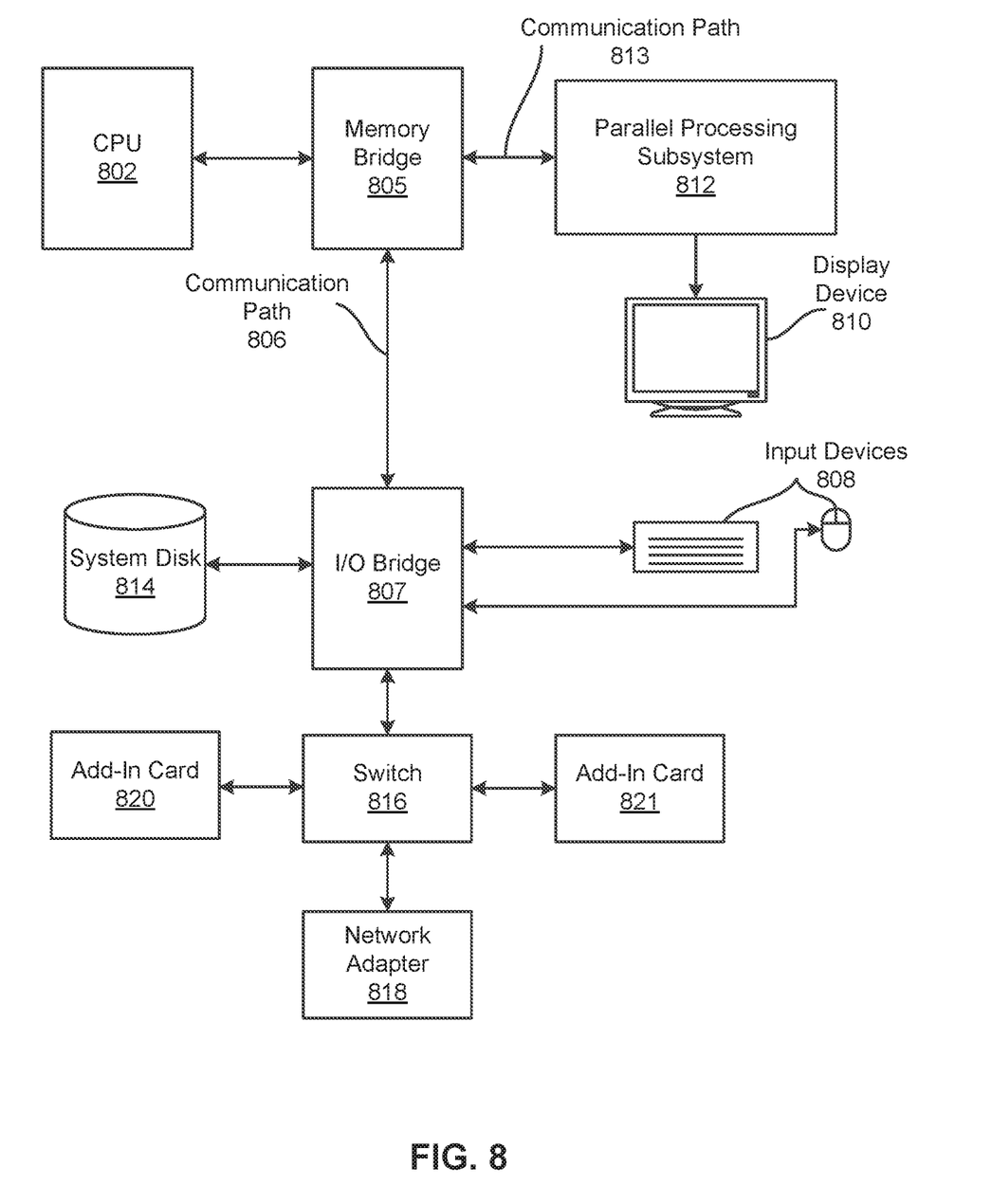
FIG. 8 is a block diagram illustrating a computer system configured to implement one or more aspects of various embodiments.

FIG. 8 is a block diagram illustrating a computer system 800 configured to implement one or more aspects of various embodiments. In some embodiments, computer system 800 is a server machine operating in a data center or a cloud computing environment that provides scalable computing resources as a service over a network.

In various embodiments, computer system 800 includes, without limitation, a central processing unit (CPU) 802 and a system memory 804 coupled to a parallel processing subsystem 812 via a memory bridge 805 and a communication path 813. Memory bridge 805 is further coupled to an I/O (input/output) bridge 807 via a communication path 806, and I/O bridge 807 is, in turn, coupled to a switch 816.

In one embodiment, I/O bridge 807 is configured to receive user input information from optional input devices 808, such as a keyboard or a mouse, and forward the input information to CPU 802 for processing via communication path 806 and memory bridge 805. In some embodiments, computer system 800 may be a server machine in a cloud computing environment. In such embodiments, computer system 800 may not have input devices 808. Instead, computer system 800 may receive equivalent input information by receiving commands in the form of messages transmitted over a network and received via the network adapter 818. In one embodiment, switch 816 is configured to provide connections between I/O bridge 807 and other components of the computer system 800, such as a network adapter 818 and various add-in cards 820 and 821.

In one embodiment, I/O bridge 807 is coupled to a system disk 814 that may be configured to store content and applications and data for use by CPU 802 and parallel processing subsystem 812. In one embodiment, system disk 814 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 807 as well.

In various embodiments, memory bridge 805 may be a Northbridge chip, and I/O bridge 807 may be a Southbridge chip. In addition, communication paths 806 and 813, as well as other communication paths within computer system 800, may be implemented using any technically suitable protocols, including, without limitation, AGP (Accelerated Graphics Port), HyperTransport, or any other bus or point-to-point communication protocol known in the art.

In some embodiments, parallel processing subsystem 812 comprises a graphics subsystem that delivers pixels to an optional display device 810 that may be any conventional cathode ray tube, liquid crystal display, light-emitting diode display, or the like. In such embodiments, the parallel processing subsystem 812 incorporates circuitry optimized for graphics and video processing, including, for example, video output circuitry. As described in greater detail below in conjunction with FIGS. 9 and 10, such circuitry may be incorporated across one or more parallel processing units (PPUs), also referred to herein as parallel processors, included within parallel processing subsystem 812. In other embodiments, the parallel processing subsystem 812 incorporates circuitry optimized for general purpose and/or compute processing. Again, such circuitry may be incorporated across one or more PPUs included within parallel processing subsystem 812 that are configured to perform such general purpose and/or compute operations. In yet other embodiments, the one or more PPUs included within parallel processing subsystem 812 may be configured to perform graphics processing, general purpose processing, and compute processing operations. System memory 804 includes at least one device driver configured to manage the processing operations of the one or more PPUs within parallel processing subsystem 812.

In various embodiments, parallel processing subsystem 812 may be integrated with one or more of the other elements of FIG. 8 to form a single system. For example, parallel processing subsystem 812 may be integrated with CPU 802 and other connection circuitry on a single chip to form a system on chip (SoC).

In one embodiment, CPU 802 is the master processor of computer system 800, controlling and coordinating operations of other system components. In one embodiment, CPU 802 issues commands that control the operation of PPUs. In some embodiments, communication path 813 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 802, and the number of parallel processing subsystems 812, may be modified as desired. For example, in some embodiments, system memory 804 could be connected to CPU 802 directly rather than through memory bridge 805, and other devices would communicate with system memory 804 via memory bridge 805 and CPU 802. In other embodiments, parallel processing subsystem 812 may be connected to I/O bridge 807 or directly to CPU 802, rather than to memory bridge 805. In still other embodiments, I/O bridge 807 and memory bridge 805 may be integrated into a single chip instead of existing as one or more discrete devices. Lastly, in certain embodiments, one or more components shown in FIG. 8 may not be present. For example, switch 816 could be eliminated, and network adapter 818 and add-in cards 820, 821 would connect directly to I/O bridge 807.

In sum, the disclosed embodiments adapt the frequency response of a receiver using a number of techniques, which can be performed separately and/or combined sequentially and/or iteratively. The techniques include a coarse grid search followed by a fine grid search of multiple frequency response parameters that control the frequency response of the receiver. The techniques also include adjusting the frequency response parameters using stochastic hill climbing operations and/or genetic mutation. The techniques also include applying incremental final adjustments to the adjusted and/or mutated frequency response parameters to improve performance metrics in the vicinity of values of the parameters obtained using grid search, stochastic hill climbing, and/or genetic mutation.

One technological advantage of the disclosed techniques is increased efficiency and/or speed of adapting frequency response parameters over conventional techniques that perform exhaustive searches of all possible combination of parameter values. Another technological advantage of the disclosed techniques includes improved performance over conventional least mean squares (LMS) techniques that cause coupling in the adaptation of larger numbers of parameters. Consequently, the disclosed techniques provide technological improvements in interfaces, circuits, software, routines, and/or techniques for performing linear and/or analog equalization.

1. In some embodiments, a method for adjusting a frequency response of a receiver comprises determining a first set of values associated with a plurality of frequency response parameters, wherein each frequency response parameter controls at least a portion of the frequency response of the receiver, generating a second set of values associated with the plurality of frequency response parameters by, for each value in the first set of values, modifying the value until a performance metric associated with the receiver reaches a local maximum; and adjusting the frequency response of the receiver based on the second set of values.

2. The method of clause 1, wherein determining the first set of values comprises setting one or more frequency response parameters to predetermined values; and performing a first grid search using a larger step size using a first grid size associated with the predetermined values to select initial values associated with the frequency response parameters.

3. The method of clauses 1-2, wherein determining the first set of values further comprises performing a second grid search that applies a second grid size to a vicinity of the initial values to select final values associated with the frequency response parameters, wherein the second grid size is smaller than the first grid size.

4. The method of clauses 1-3, wherein the initial values and the final values are selected to optimize the performance metric.

5. The method of clauses 1-4, wherein generating the second set of values comprises applying a first set of hill climbing operations to the first set of values to generate a set of locally optimized values associated with the frequency response parameters.

6. The method of clauses 1-5, wherein generating the second set of values further comprises displacing each value in the set of locally optimized values to generate a set of mutated values.

7. The method of clauses 1-6, wherein generating the second set of values further comprises applying a second set of hill climbing operations to the set of mutated values to generate the second set of values.

8. The method of clauses 1-7, wherein displacing each value in the set of locally optimized values comprises applying a different random displacement, up to a maximum displacement value, to each value in the set of locally optimized values.

9. The method of clauses 1-8, wherein applying the first set of hill climbing operations to the first set of values comprises sequentially applying random displacements within a range of displacement values to each of the first set of values in a specified order of the frequency response parameters.

10. The method of clauses 1-9, wherein applying the first set of hill climbing operations to the first set of values comprises performing a pre-specified number of hill climbing iterations to adjust the first set of values.

11. The method of clauses 1-10, wherein generating the second set of values comprises applying incremental adjustments to the second set of values until an improvement in the performance metric stops.

12. The method of clauses 1-11, wherein the incremental adjustments comprise retesting current unit step adjustments in the positive and negative directions to the second set of values.

13. The method of clauses 1-12, wherein determining the first set of values comprises setting the first set of values to seed values for the frequency response parameters.

14. The method of clauses 1-13, wherein determining the first set of values associated with the plurality of frequency response parameters comprises performing a grid search of one or more values in the first set of values; and setting remaining values in the first set of values to seed values associated with the one or more values.

15. The method of clauses 1-14, wherein generating the second set of values comprises selecting a direction of adjustment for a first value of a first parameter based on a highest performance metric selected from a first performance metric associated with the first value, a second performance metric associated with a positive adjustment to the first value, and a third performance metric associated with a negative adjustment to the first value; and modifying the first value in the direction of adjustment until a corresponding performance metric stops improving.

16. The method of clauses 1-15, wherein generating the second set of values further comprises selecting, up to a maximum amount, a random amount by which the first value is modified using the positive adjustment and the negative adjustment.

17. The method of clauses 1-16, wherein selecting the direction of adjustment for the first value of the first parameter based on the highest performance metric comprises selecting the direction of adjustment associated with a higher priority when the highest performance metric is found in more than one of the first performance metric, the second performance metric, and the third performance metric.

18. The method of clauses 1-17, wherein the plurality of frequency response parameters comprises at least one of a direct current (DC) gain, a high frequency (HF) gain, a low frequency (LF) gain, a LF pole, a medium frequency (MF) gain, and a MF pole.

19. In some embodiments, a non-transitory computer readable medium stores instructions that, when executed by a processor, cause the processor to adjust a frequency response of a receiver by performing the steps of determining a first set of values associated with a plurality of frequency response parameters, wherein each frequency response parameter controls at least a portion of the frequency response of the receiver; generating a second set of values associated with the plurality of frequency response parameters by, for each value in the first set of values, modifying the value until a performance metric associated with the receiver reaches a local maximum; and adjusting the frequency response of the receiver based on the second set of values.

20. The non-transitory computer readable medium of clause 19, wherein determining the first set of values comprises setting one or more frequency response parameters to predetermined values; and performing a first grid search using a larger step size using a first grid size associated with the predetermined values to select initial values associated with the frequency response parameters.

21. The non-transitory computer readable medium of clauses 19-20, wherein determining the first set of values further comprises performing a second grid search that applies a second grid size to the initial values to select final values associated with the frequency response parameters, wherein the second grid size is smaller than the first grid size.

22. The non-transitory computer readable medium of clauses 19-21, wherein the initial values and the final values are selected to optimize the performance metric.

23. The non-transitory computer readable medium of clauses 19-22, wherein generating the second set of values comprises mutating the first set of values based on one or more random displacement values associated with the frequency response parameters to generate one or more sets of mutated values; and selecting a set of mutated values with a highest value of the performance metric as the second set of values.

24. The non-transitory computer readable medium of clauses 19-23, wherein mutating the first set of values comprises applying, up to a maximum displacement value, a different random displacement value to each value in the first set of values to produce a first set of mutated values; and applying, up to the maximum displacement value, an additional random displacement to each value in the first set of mutated values to produce a second set of mutated values.

25. The non-transitory computer readable medium of clauses 19-24, wherein mutating the first set of values comprises applying hill climbing adjustments to the first set of values to produce a set of locally optimized values; and applying the one or more random displacement values to the set of locally optimized values to produce a set of mutated values.

26. The non-transitory computer readable medium of clauses 19-25, wherein generating the second set of values further comprises applying incremental adjustments to the selected set of mutated values until an improvement in the performance metric stops.

27. The non-transitory computer readable medium of clauses 19-26, wherein the incremental adjustments comprise unit step adjustments in the positive and negative directions to the second set of values.

28. The non-transitory computer readable medium of clauses 19-27, wherein applying the hill climbing adjustments to the first set of values comprises sequentially applying random displacements within a range of displacement values to each of the first set of values in a specified order of the frequency response parameters.

29. The non-transitory computer readable medium of clauses 19-28, wherein applying the hill climbing adjustments to the first set of values comprises performing a pre-specified number of hill climbing iterations to adjust the first set of values.

30. The non-transitory computer readable medium of clauses 19-29, wherein determining the first set of values associated with the plurality of frequency response parameters comprises performing a grid search of one or more values in the first set of values; and setting remaining values in the first set of values to seed values associated with the one or more values.

31. The non-transitory computer readable medium of clauses 19-30, wherein generating the second set of values comprises selecting a direction of adjustment for a first value of a first parameter based on a highest performance metric selected from a first performance metric associated with the first value, a second performance metric associated with a positive adjustment to the first value, and a third performance metric associated with a negative adjustment to the first value; and modifying the first value in the direction of adjustment until a corresponding performance metric stops improving.

32. The non-transitory computer readable medium of clauses 19-31, wherein generating the second set of values further comprises selecting a random amount by which the first value is modified using the positive adjustment and the negative adjustment.

33. The non-transitory computer readable medium of clauses 19-32, wherein selecting the direction of adjustment for the first value of the first parameter based on the highest performance metric comprises selecting the direction of adjustment associated with a higher priority when the highest performance metric is found in more than one of the first performance metric, the second performance metric, and the third performance metric.

34. The non-transitory computer readable medium of clauses 19-33, wherein the plurality of frequency response parameters comprises at least one of a direct current (DC) gain, a high frequency (HF) gain, a low frequency (LF) gain, a LF pole, a medium frequency (MF) gain, and a MF pole.

35. The non-transitory computer readable medium of clauses 19-34, wherein the performance metric comprises a figure of merit (FOM) associated with an eye diagram for the frequency response.

36. In some embodiments, a system comprises a memory storing instructions; and a processor for executing the instructions to determine a first set of values associated with a plurality of frequency response parameters, wherein each frequency response parameter controls at least a portion of a frequency response of a receiver; and generate a second set of values associated with the plurality of frequency response parameters by, for each value in the first set of values, modifying the value until a performance metric associated with the receiver reaches a local maximum, wherein the frequency response of the receiver is adjusted based on the second set of values.

37. The system of clause 36, wherein the plurality of frequency response parameters comprises at least one of a direct current (DC) gain, a high frequency (HF) gain, a low frequency (LF) gain, a LF pole, a medium frequency (MF) gain, and a MF pole.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for equalizing a channel of a receiver, the method comprising:
   performing one or more stochastic gradient hill climbing operations and one or more genetic mutation operations on one or more parameters used to control a frequency response to a signal received over the channel;
   determining that, in response to the one or more stochastic gradient hill climbing operations and the one or more genetic mutation operations, a figure of merit of an eye diagram associated with the frequency response to the signal has reached a local maximum;
   determining, when the figure of merit is at the local maximum, one or more values for the one or more parameters; and
   performing at least one linear equalization operation on the signal based on the one or more values for the one or more parameters.

2. The method of claim 1, wherein the one or more stochastic gradient hill climbing operations comprise, for each parameter included in the one or more parameters, applying one or more hill climbing adjustments until one or more performance metrics associated with the parameter have reached local maxima.

3. The method of claim 2, wherein each hill climbing adjustment included in the one or more hill climbing adjustments comprises:
   selecting an amount by which to adjust a value of the parameter;
   performing a positive adjustment to the value of the parameter by the amount to generate a positive adjustment value;
   performing a negative adjustment to the value of the parameter by the amount to generate a negative adjustment value; and
   adjusting the value of the parameter based on one or more performance metric values associated with the value of the parameter, the positive adjustment value, and the negative adjustment value.

4. The method of claim 1, further comprising, prior to performing the one or more stochastic gradient hill climbing operations and the one or more genetic mutation operations, initializing the one or more parameters to a first set of predetermined values corresponding to a loss over the channel.

5. The method of claim 4, further comprising:
   initializing the one or more parameters to a second set of predetermined values; and
   performing one or more additional stochastic gradient hill climbing operations starting from the second set of predetermined values and one or more or more additional genetic mutation operations.

6. The method of claim 1, wherein the one or more genetic mutation operations are performed on at least one of predetermined values of the one or more parameters for a loss or range of losses over the channel, values of the one or more parameters selected using a grid search, or values of the one or more parameters selected using one or more rounds of stochastic hill climbing.

7. The method of claim 1, wherein the one or more genetic mutation operations comprise one or more rounds of genetic mutation, and each round of genetic mutation displaces each parameter included in the one or more parameters by a positive or negative amount.

8. The method of claim 1, wherein the figure of merit comprises at least one of a height, width, amplitude, opening factor, rise time, fall time, jitter, level zero, level one, bit error rate (BER), or level mean of an eye; a weighted combination of multiple eye measurements; or a signal-to-noise ratio.

9. The method of claim 1, further comprising performing at least one of one or more grid search operations or one or more periodic adaptation operations on the one or more parameters or one or more additional parameters.

10. One or more non-transitory computer-readable storage media including instructions that, when executed by at least one processor, cause the at least one processor to perform steps for equalizing a channel of a receiver, the steps comprising:
performing one or more stochastic gradient hill climbing operations and one or more genetic mutation operations on one or more parameters used to control a frequency response to a signal received over the channel;
determining that, in response to the one or more stochastic gradient hill climbing operations and the one or more genetic mutation operations, a figure of merit of an eye diagram associated with the frequency response to the signal has reached a local maximum;
determining, when the figure of merit is at the local maximum, one or more values for the one or more parameters; and
performing at least one linear equalization operation on the signal based on the one or more values for the one or more parameters.

11. The one or more non-transitory computer-readable storage media of claim 10, wherein performing the one or more stochastic gradient hill climbing operations and the one or more genetic mutation operations comprises performing one or more rounds of stochastic gradient hill climbing followed by one or more corresponding rounds of genetic mutations.

12. The one or more non-transitory computer-readable storage media of claim 10, wherein the one or more parameters comprise at least one of a medium frequency (MF) gain, a MF pole, a low frequency (LF) gain, or a LF pole.

13. The one or more non-transitory computer-readable storage media of claim 12, further comprising performing grid search operations on at least one of a direct current gain or a high frequency gain parameter.

14. The one or more non-transitory computer-readable storage media of claim 10, the steps further comprising, prior to performing the one or more stochastic gradient hill climbing operations and the one or more genetic mutation operations, initializing the one or more parameters to a first set of predetermined values corresponding to a loss over the channel.

15. The one or more non-transitory computer-readable storage media of claim 10, wherein the one or more stochastic gradient hill climbing operations comprise, for each parameter included in the one or more parameters, applying one or more hill climbing adjustments until one or more performance metrics associated with the parameter have reached local maxima.

16. The one or more non-transitory computer-readable storage media of claim 10, the steps further comprising, prior to performing the one or more stochastic gradient hill climbing operations and one or more genetic mutation operations, initializing the one or more parameters to a first set of predetermined values corresponding to a loss over the channel.

17. The one or more non-transitory computer-readable storage media of claim 10, the steps further comprising performing at least one of one or more grid search operations or one or more periodic adaptation operations on the one or more parameters or one or more additional parameters.

18. The one or more non-transitory computer-readable storage media of claim 10, wherein the one or more genetic mutation operations are performed on at least one of predetermined values of the one or more parameters for a loss or range of losses over the channel, values of the one or more parameters selected using a grid search, or values of the one or more parameters selected using one or more rounds of stochastic hill climbing.

19. A system, comprising:
one or more memories storing instructions; and
one or more processors that are coupled to the one or more memories and, when executing the instructions, are configured to:
perform one or more stochastic gradient hill climbing operations and one or more genetic mutation operations on one or more parameters used to control a frequency response to a signal received over the channel,
determine that, in response to the one or more stochastic gradient hill climbing operations and the one or more genetic mutation operations, a figure of merit of an eye diagram associated with the frequency response to the signal has reached a local maximum,
determine, when the figure of merit is at the local maximum, one or more values for the one or more parameters, and
perform at least one linear equalization operation on the signal based on the one or more values for the one or more parameters.

20. The system of claim 19, wherein the one or more processors are further configured to, prior to performing the one or more stochastic gradient hill climbing operations and the one or more genetic mutation operations, initialize the one or more parameters to a set of predetermined values corresponding to a loss over the channel.

* * * * *

UNITED STATES PATENT AND TRADEMARK OFFICE
CERTIFICATE OF CORRECTION

| | | |
|---|---|---|
| PATENT NO. | : 11,018,909 B2 | Page 1 of 1 |
| APPLICATION NO. | : 16/993180 | |
| DATED | : May 25, 2021 | |
| INVENTOR(S) | : Vishnu Balan et al. | |

It is certified that error appears in the above-identified patent and that said Letters Patent is hereby corrected as shown below:

On the Title Page

Item (72) Inventors:
Please delete "Mohammed Mobin" and insert --Mohammad Mobin--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*